(12) United States Patent
Klatt

(10) Patent No.: US 6,290,045 B1
(45) Date of Patent: Sep. 18, 2001

(54) ACTUATING MECHANISM FOR A CLUTCH

(75) Inventor: Alfred Klatt, Wathlingen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 09/461,558

(22) Filed: Dec. 14, 1999

(30) Foreign Application Priority Data

Dec. 17, 1998 (DE) .............................. 198 58 271

(51) Int. Cl.$^7$ .................................. F16D 48/06
(52) U.S. Cl. ......................... 192/85 C; 192/91 R
(58) Field of Search ............... 192/85 C, 91 R, 192/85 R, 52.4

(56) References Cited

U.S. PATENT DOCUMENTS

| | | |
|---|---|---|
| 4,796,739 * | 1/1989 | Jonner et al. ............ 192/85 R X |
| 5,579,882 | 12/1996 | Stuhldreher . |
| 5,676,229 | 10/1997 | Bates . |

FOREIGN PATENT DOCUMENTS

| | | |
|---|---|---|
| 43 23 485 | 1/1995 | (DE) . |
| 43 24 063 | 1/1995 | (DE) . |
| 195 37 393 | 4/1997 | (DE) . |
| 197 07 960 | 9/1998 | (DE) . |
| 0 516 309 B1 | 12/1992 | (EP) . |
| 0 710 580 | 3/1996 | (EP) . |
| 0 843 108 A2 | 5/1998 | (EP) . |

* cited by examiner

Primary Examiner—Charles A. Marmor
Assistant Examiner—Saúl Rodriguez
(74) Attorney, Agent, or Firm—Proskauer Rose LLP

(57) ABSTRACT

An actuating mechanism for a clutch implements an operator-dependent clutch actuation by sensing and transmitting an operator force signal, in the form of a target-value for the control circuit representative of the operator force, to a closed loop control system of the actuating mechanism. Greater sensitivity of operator-dependent clutch actuation is thereby achieved, as compared with a known automatic actuating mechanism for a clutch, in which the operator force alone controls an operated-initiated clutch actuation. Vehicles with automatic transmissions represent an important area of application for the invention.

8 Claims, 2 Drawing Sheets

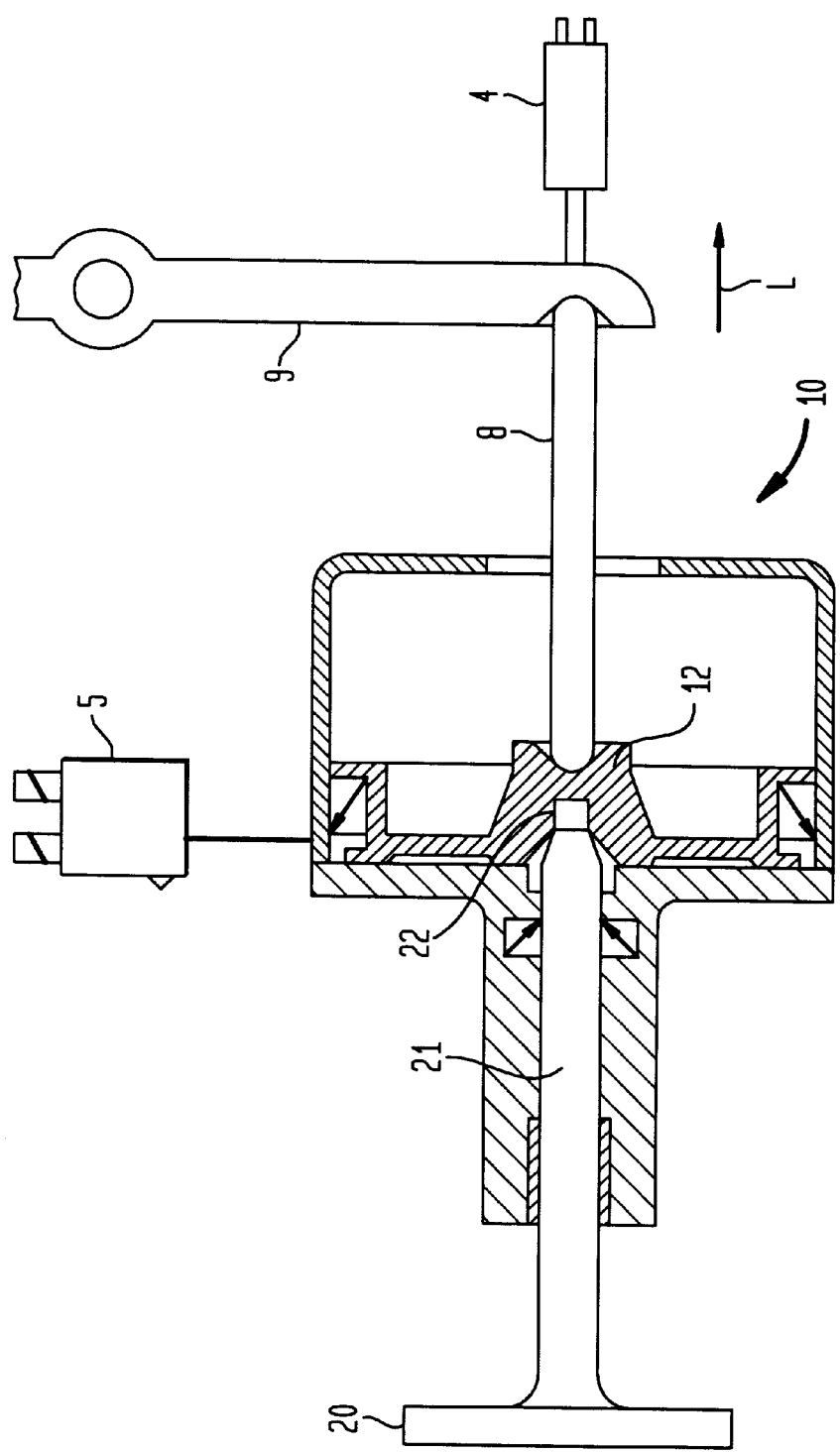

ACTUATING MECHANISM FOR A CLUTCH

BACKGROUND OF THE INVENTION

The invention relates to an actuating mechanism for a clutch, and more particularly, an actuating mechanism for a clutch in which a control system receives target-value signals and an actual-value signal representing the actual clutch stroke, and which controls the clutch stroke according to the received target-value and actual-value signals by means of pressure transmitted to an actuating cylinder.

An actuating mechanism of this type is disclosed, for example, in EP-B-0 710 580. Such device enables an automatically regulated clutch actuation and an operator-dependent clutch actuation in a transmission for the purpose of shifting gears.

In the automatic clutch actuation, the control system regulates the stroke of the clutch via an electrically driven hydraulic master cylinder and a hydraulic slave cylinder integrated into the actuating cylinder upon receiving target-value signals and the actual-stroke signal. In accordance with the known device, the actual-stroke signal is obtained from a piston rod of the electrically driven master cylinder. The stroke of this piston rod has a fixed ratio to the clutch stroke. The actuating cylinder transmits the force exerted upon the slave cylinder piston by the pressure in the slave cylinder in the disengagement direction of the clutch, to the clutch. This force is, however, insufficient to actuate the clutch. For this reason, the pressure in the slave cylinder is also transmitted as control pressure to a proportional valve which allows pressure proportional to this control pressure to pass from a pressure source into the actuating cylinder, which thereby produces a sufficient force for the actuation of the clutch in its disengagement direction.

The operator-dependent clutch actuation is provided, in the known actuating mechanism, for purposes of permitting an emergency actuation of the clutch. The control system and the electrically driven master cylinder do not participate in this type of actuation. For this type of actuation, the operator produces the pressure in the slave cylinder integrated in the actuating cylinder which triggers the clutch via a master cylinder by means of an actuating element. This pressure is also transmitted to the proportional valve, which achieves the result described above. The force exerted in such instance by the slave cylinder piston can be designated as an operator force.

Due to the non-participation of the control system, the known actuating system offers only a non-regulated open loop operator-dependent clutch actuation. As a result, the sensitivity of the operator-dependent clutch actuation may be limited.

It is therefore an object of the present invention to improve the sensitivity of operator-dependent clutch actuation in an actuation system of the type mentioned above.

SUMMARY OF THE INVENTION

In accordance with this and other objects of the invention, there is provided an actuating mechanism for a clutch which includes an actuating cylinder which produces a force in a disengagement direction of the clutch when a pressure is applied. A control system is provided, which receives target-value signals and an actual-stroke signal representing an actual clutch stroke, and which regulates the clutch stroke according to the received target-value and actual-stroke signals by controlling the pressure transmitted to the actuating cylinder. In accordance with the invention, an operator-force sensor is further provided for sensing an operator force and for producing an operator force signal which is transmitted to the control system. The control system processes this operator force signal as the target-value signal for the clutch stroke regulation with priority over other target-value signals.

In addition to the above-stated drawbacks of the prior art, it is further noted that practical application of the known actuating mechanism is also very expensive. The invention makes it possible to reduce necessary expenditures.

The above, and other objects, features and advantages of the present invention will become apparent from the following description read in conjunction with the accompanying drawing, in which like reference numerals designate the same elements and functions.

BRIEF DESCRIPTION OF THE FIGURES

FIG. 2 is a schematic representation of an actuating system for a clutch in accordance with another embodiment of the invention.

DETAILED DESCRIPTION OF THE PREFERRED EMBODIMENT

Figure 1:
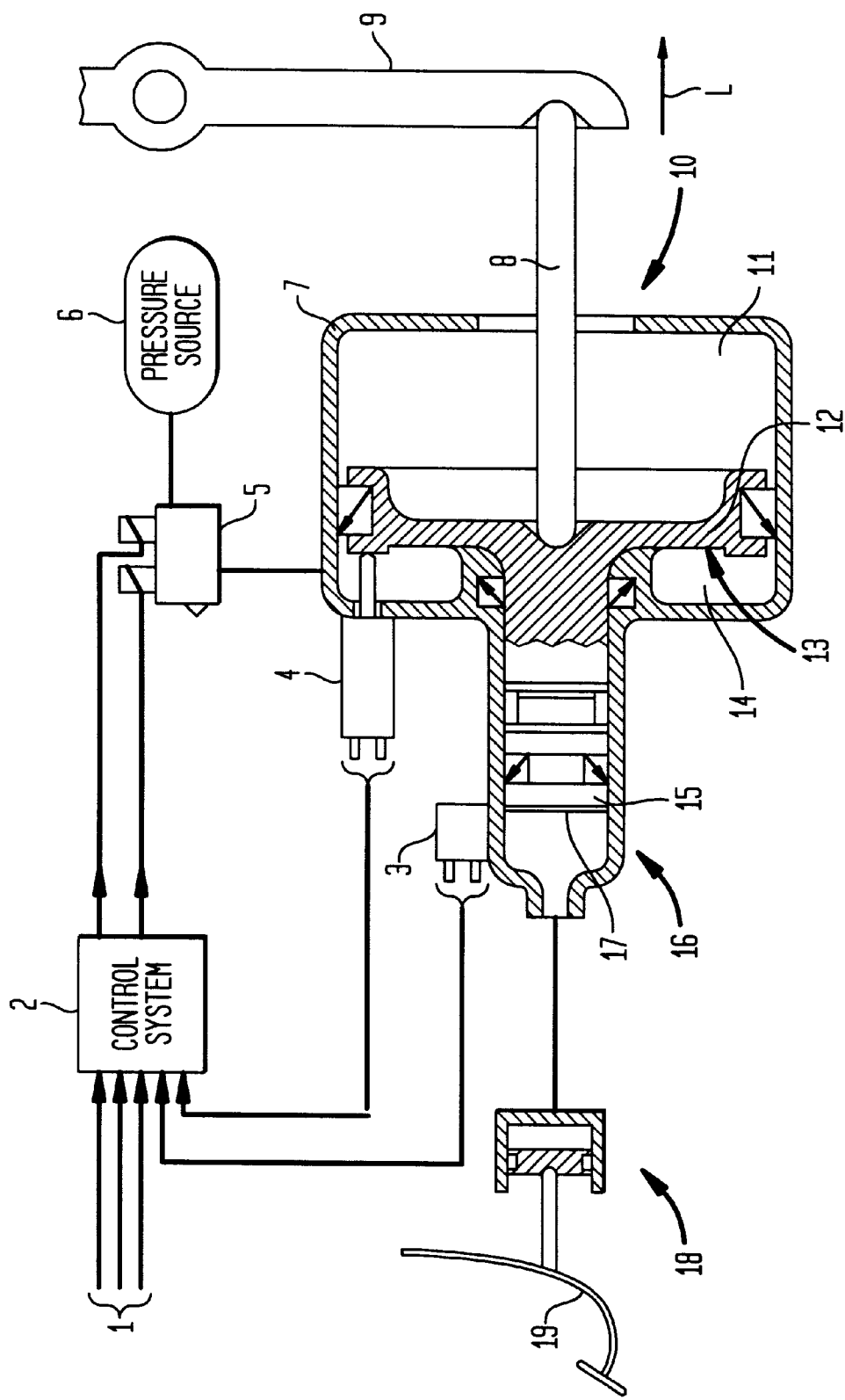
FIG. 1 is a schematic representation of an actuating system for a clutch in accordance with an embodiment of the invention.

Referring to the figures, and in particular FIG. 1, an actuating system for a clutch is depicted, and which is comprised of an automatic actuation mechanism and an operator-dependent actuation mechanism which, as explained below in further detail, extensively use components in common.

The essential components of the automatic actuation mechanism are an actuating cylinder 10, a control system 2, signal transmitters, an electrically actuated valve arrangement 5 and a pressure source 6. With regard to the signal transmitters, only a stroke sensor 4 located on the actuating cylinder 10 is depicted. The stroke sensor 4 transmits an actual-stroke signal representing the actual clutch stroke to the control system 2.

The actuating cylinder 10 comprises a cylinder housing 7 and an actuating piston 12, capable of sealedly moving within the cylinder housing 7. The actuating piston 12 divides an interior space of the cylinder housing 7 into a pressure chamber 14 and an atmospheric chamber 11. The actuating piston 12 presents an active surface 13 which delimits the pressure chamber 14.

The actuating piston 12 is engaged on a side thereof facing the atmospheric chamber 11 with one end of the clutch lever 9, which is shown only in part, via a ram 8. The clutch lever 9 is engaged in a known manner with a clutch (not shown) such that a movement of its end assigned to the ram 8 triggers a clutch stroke. An arrow L designates the direction of the clutch-disengagement. The stroke sensor 4 senses the stroke of the actuating piston 12 as a measure of the clutch stroke. The stroke sensor 4 can also be installed at another suitable location, for example, on the clutch lever 9.

Inputs of the control system 2, indicated by entering arrow points of the corresponding feeders, are connected to the target-value signal transmitters and the stroke sensor 4 which produce the signals that are relevant for the automatic clutch actuation. The feeders assigned to the target-value signal transmitters are designated, as a group, by the reference numeral 1. Outputs of the control system 2, indicated by the outgoing arrows, are connected to electrical actuation devices of the valve arrangement 5. The control system 2 may frequently also detect the signals of other signal transmitters and may emit signals for additional functions, for example, gear shifting.

The valve arrangement 5 is installed in the path of flows between the pressure chamber 14 and the pressure source 6, or between the pressure chamber 14 and the atmosphere and, depending on actuation by the control system 2, either connects the pressure chamber 14 to the pressure source 6 or to the atmosphere, or breaks both connections. The automatic actuation mechanism is thus designed for air as the pressure medium, but can also be adapted for use with other media, for example, hydraulic pressure media, by appropriate measures known to the person schooled in the art. The valve arrangement 5 can be of any suitable design that ensures the required functions. For example, the valve arrangement described in U.S. Pat. No. 5,676,229, which is incorporated herein by reference, can be considered as a viable option. In addition, the valve arrangement 5 may be integrated into the actuating cylinder 10.

FIG. 1 shows the actuating mechanism at rest, i.e., with a non-actuated (engaged) clutch. In this state, the valve arrangement 5 connects the pressure chamber 14 with the atmosphere, so that the restoration forces of the clutch can displace the actuating piston 12 via the clutch lever 9 and the ram 8, in opposition to the direction of disengagement L, into its rest position as shown.

When the control system 2 detects a command for the actuation of the clutch by means of its electronic equipment and/or its programming, on the basis of the supplied target-value signals, it transmits actuating signals to the valve arrangement 5, which thereupon allows pressure to flow from the pressure source 6 into the pressure chamber 14, and adjusts this pressure, or maintains it, in such manner that the actual-stroke signal indicates a clutch stroke that corresponds to the target-value signals. When the control system 2 recognizes a command for a clutch back-stroke, it actuates the valve arrangement 5 for the adjustment or maintenance of the appropriate pressure reduction or for the maintenance of an appropriately reduced pressure.

The operator-dependent actuating mechanism consists of an actuating element 19, a hydraulic transmission chain 16, 18, the actuating cylinder 10, the control system 2, the stroke sensor 4, an operator force sensor 3, the valve arrangement 5 and the pressure source 6.

The hydraulic transmission chain consists of a master cylinder 18 and a slave cylinder 16. The slave cylinder 16 is integrated into the actuating cylinder 10 in such manner that the slave cylinder piston 15 is aligned in a row with the actuating piston 12.

The actuating element 19 is depicted in the form of a pedal, but can be designed in any other suitable manner. When the operator acts upon the actuating element 19 with an actuating force, a corresponding pressure is thereby produced in the master cylinder 18, which is transmitted into the slave cylinder 16. The operator force produced by this pressure on the active surface 17 of the slave cylinder piston 15 is transmitted by the slave cylinder piston 15 to the actuating piston 12, which in turn conveys this force via the ram 8 to the clutch lever 9 and thereby to the clutch. The direction of the operator force is in the disengagement direction L.

The operator force transmitted from the actuating piston 12 to the clutch is not alone sufficient to actuate the clutch, but supplies the operator with a feedback message concerning the actuating force expended by him.

The operator force sensor 3, as depicted, is provided in the form of a pressure sensor, and is located on the slave cylinder 15, so that it registers the operator force in the form of the pressure which produces this operator force.

The control system 2 utilizes, in its design, suitable equipment and/or programming so that it reacts to the supply of an operator force signal as if it had received target-value signals only via the feeders 1. In such manner, the control system 2 regulates the clutch stroke by means of the valve arrangement 5 and by means of the pressure in the pressure chamber 14 according to the value of the operator force signal.

If the operator utilizes the operator-dependent actuating mechanism during an automatic clutch actuation, the control system 2 replaces the target-value signals arriving over the feeders 1 with the operator force signal. The control system 2 can be further developed in such manner that it carries out this replacement smoothly, so that no discontinuity occurs in the actuation of the clutch.

If the operator utilizes the operator-dependent actuation mechanism while the actuating mechanism and the clutch are in rest position, the control system 2 reacts to the operator signal from the beginning as to arriving target-value signals.

In the described actuating mechanism, the closed loop control circuit provided for the automatic actuating mechanism is thus tied into the operator-dependent clutch actuation. For this reason, such actuating mechanism allows for a very sensitive clutch actuation by the operator-dependent actuating mechanism.

The operator-dependent actuation mechanism enables the operator to effect an emergency actuation in the event of a malfunction of the target-value sensors and/or in the elements of the control system 2 assigned to them, and also enables the operator to exclusively actuate the clutch as desired, for example, during difficult maneuvers.

The control system 2 can be designed so that it associates a particular clutch stroke to every value of the operator force signal. Furthermore, the control system 2 can be designed so that the clutch stroke is a linear function of the operator force signal, i.e., such that a proportionality exists between the two magnitudes by a given factor.

Turning now to FIG. 2, an actuation mechanism is depicted in detail in which the hydraulic transmission chain 16, 18 and the pressure sensor used as the operator force sensor 3 are replaced, respectively, by mechanical means 20, 21 and by an operator force sensor 22 in the form of a true force sensor. In the example, the mechanical means 20, 21 comprise a connecting rod 21 and a treadle 20 which is formed thereon. In accordance with the depicted embodiment, the actuating force imparted by the operator to the treadle 20 is transmitted directly in form of operator force to the actuating piston 12. The operator force sensor 22, installed in the line of flow of this force, supplies the operator force signal.

The mechanical means shown, which includes connecting rod 21 and treadle 20, represent an especially simple embodiment of possible mechanical means. The mechanical means could, for example, also consist of a pedal and a transmission rod system, in which case a transmission ratio would exist between the actuating force expended by the operator and the operator force.

The stroke sensor 4 is not mounted on the actuating cylinder 10 in this embodiment, but rather on the clutch lever 9.

The operator force sensor could also be installed at a different location in a manner not shown here, for example, at the location upon which the operator's force is directly applied, such as, for example, on the treadle 20 or on the attack surface of an actuating element that may be present.

In all other matters the above explanations regarding one embodiment apply directly or in corresponding application to the other embodiment, barring anything to the contrary in these explanations. For example, the operator force sensor in FIG. 1 can also be located in the form of true force sensor between the slave cylinder piston 15 and the actuating piston 12, or at the location where the operator's force is applied.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An actuating mechanism for a clutch, comprising:

an actuating cylinder which produces a force in a disengagement direction of the clutch when a pressure is applied;

a control system which receives target-value signals and an actual-stroke signal representing an actual clutch stroke from a stroke sensor, and which regulates the clutch stroke according to the received target-value and actual stroke signals by controlling the pressure transmitted to the actuating cylinder; and an operator-force sensor for sensing an operator force and for producing an operator force signal which is transmitted to the control system, said control system processing said operator force signal as the target-value signal for the clutch stroke regulation with priority over other target-value signals.

2. An actuating mechanism according to claim 1, further comprising a hydraulic pressure transmission chain for transmitting the operator force to the actuating cylinder.

3. An actuating mechanism according to claim 2, wherein the operator-force sensor comprises a pressure sensor for sensing the pressure in the pressure transmission chain.

4. An actuating mechanism according to claim 1, further comprising mechanical means for transmitting the operator force to the actuating cylinder.

5. An actuating mechanism according to claim 1, wherein a particular clutch stroke is associated to each value of the operator force signal.

6. An actuating mechanism according to claim 5, wherein the clutch stroke is a linear function of the operator force signal.

7. An actuating mechanism according to claim 1, further comprising a mechanical linkage for transmitting the operator force to the actuating cylinder.

8. An actuating mechanism according to claim 7, wherein said mechanical linkage includes a connecting rod and a treadle.

* * * * *